United States Patent
Shandalov et al.

(10) Patent No.: US 11,920,082 B2
(45) Date of Patent: Mar. 5, 2024

(54) MONOVALENT BRINES FOR USE AS WELLBORE FLUIDS

(71) Applicant: BROMINE COMPOUNDS LTD., Beer-Sheva (IL)

(72) Inventors: Elizabeta Shandalov, Omer (IL); Mohamad Masarwa, Lehavim (IL); David Cohen, Beer Sheva (IL)

(73) Assignee: BROMINE COMPOUNDS LTD., Beer-Sheva (IL)

( * ) Notice: Subject to any disclaimer, the term of this patent is extended or adjusted under 35 U.S.C. 154(b) by 0 days.

(21) Appl. No.: 17/776,408

(22) PCT Filed: Nov. 9, 2020

(86) PCT No.: PCT/IL2020/051161
§ 371 (c)(1),
(2) Date: May 12, 2022

(87) PCT Pub. No.: WO2021/095030
PCT Pub. Date: May 20, 2021

(65) Prior Publication Data
US 2022/0396726 A1 Dec. 15, 2022

Related U.S. Application Data

(60) Provisional application No. 62/934,550, filed on Nov. 13, 2019.

(51) Int. Cl.
*C09K 8/528* (2006.01)
*C09K 8/84* (2006.01)

(52) U.S. Cl.
CPC .............. *C09K 8/528* (2013.01); *C09K 8/845* (2013.01)

(58) Field of Classification Search
None
See application file for complete search history.

(56) References Cited

U.S. PATENT DOCUMENTS 2,898,294 A 8/1959 Priest et al.
4,292,183 A 9/1981 Sanders
(Continued)

FOREIGN PATENT DOCUMENTS

AU 2017200953 C1 4/2019
AU 2015302219 B2 5/2019
(Continued)

OTHER PUBLICATIONS

International Search Report and Written Opinion issued for International Application No. PCT/IL2020/051161 dated Mar. 2, 2021, 9 pages.
(Continued)

*Primary Examiner* — John J Figueroa
(74) *Attorney, Agent, or Firm* — ROTHWELL, FIGG, ERNST & MANBECK, P.C.

(57) ABSTRACT

The invention relates to a wellbore fluid, which is a monovalent brine comprising one or more alkali bromide salt(s) and one or more TCT-reducing additive(s) selected from the group consisting of alkali nitrates. A method of treating a subterranean formation, comprising placing the wellbore fluids of the invention in a wellbore in the subterranean formation is also provided.

11 Claims, 4 Drawing Sheets

(56) References Cited

U.S. PATENT DOCUMENTS

| | | | |
|---|---|---|---|
| 5,985,800 A * | 11/1999 | Patel | E21B 21/068 |
| | | | 507/140 |
| 8,003,578 B2 * | 8/2011 | Monroe | C09K 8/514 |
| | | | 166/305.1 |
| 8,697,611 B2 | 4/2014 | Zhang et al. | |
| 11,021,641 B2 | 6/2021 | Ray et al. | |
| 11,136,486 B2 | 10/2021 | Mack | |
| 2008/0135302 A1 | 6/2008 | Zhang et al. | |
| 2009/0203554 A1 | 8/2009 | Monroe et al. | |
| 2018/0298266 A1 | 10/2018 | Marr | |

FOREIGN PATENT DOCUMENTS

| | | |
|---|---|---|
| EP | 3180408 A1 | 6/2017 |
| WO | 2016025137 A1 | 2/2016 |
| WO | 2019168562 A1 | 9/2019 |

OTHER PUBLICATIONS

P. Cerisier et al., "Ultrasonic speed and compressibility in the fused-salt mixtures", J. Chem, Thermodynamics, 1981, vol. 13, pp. 53-59.

Sharma et al., "Ultrasonic study and allied physical parameters of uni-univalent mixed electrolytes in formamide", International Conference on Multidisciplinary Research & Practice, 2014, vol. 1, Issue VIII, pp. 358-361.

Bourouisa et al., "Purification of seawater using absorption heat transformers with water-(LiBr+LiI+LiNO'3+LiCL) and low temperature heat sources", Desalination, 2004, vol. 166, pp. 209-214.

Office Action issued for in Azerbaijan Patent Application No. a 2022 0082 dated Nov. 30, 2022, with English translation, 5 pages.

* cited by examiner

MONOVALENT BRINES FOR USE AS WELLBORE FLUIDS

This application is a 35 U.S.C. 371 National Phase Entry Application from PCT/IL2020/051161 filed on Nov. 9, 2020, which claims the benefits of the U.S. Provisional Patent Application No. 62/934,550, filed on Nov. 13, 2019, all of the disclosures of which are incorporated by reference herein in their entireties.

Aqueous metal bromide brines are used by the oil and gas well drilling industries for many decades. These industries primarily seek clear, high density brines to serve as completion, packer and workover fluids. High density is achieved by dissolving soluble salt(s) in water, to create single salt or multiple salts solutions. A list of water-soluble salts, including halide salts, that are suitable for the preparation of high-density brines can be found in U.S. Pat. No. 2,898,294, Table 1.

Another important consideration in formulating high density wellbore fluids is their stability against crystallization down to low temperatures, to guarantee that the brines remain operative over a broad temperature range. The property of interest is the true crystallization temperature (TCT) of the brine. The TCT is slightly higher than the point at which crystals first appear in the solution, because of release of heat during crystallization which leads to a slight increase of temperature; this increased temperature is the TCT, which is the property normally reported to describe a brine under consideration.

Leading halide brines found in the marketplace are calcium bromide/calcium chloride, zinc bromide/calcium bromide, and zinc bromide/calcium bromide/calcium chloride brines, which can be formulated to achieve high densities and low TCT, as described, for example, in U.S. Pat. No. 4,292,183. It should be noted that in response to environmental concerns which may drive the industry away from zinc-containing brines, a few zinc-free metal bromide wellbore fluids have been recently described in EP 3,180,408, US 2018/0298266 and WO 2019/168562, e.g., chiefly based on the combination of calcium bromide and an auxiliary water soluble salt.

Clear aqueous alkali bromides such as sodium bromide are also being used in the oil and gas well drilling industries. Nevertheless, the applicability of monovalent bromides is restricted by difficulties in formulating them to meet simultaneously the high-density and low-TCT requirements. Figure is a TCT versus concentration plot of sodium bromide clear fluid, exhibiting a characteristic minimum at 39% by weight sodium bromide in solution: the TCT of such brine is as low as −30° C. However, the density of such a brine is usually not sufficiently high (1.40 g/cc). It is seen from the graph that increasing the concentration of the salt, i.e., increasing the density of the fluid, is accompanied by a sharp increase of the TCT. The product currently on the market is sodium bromide clear brine of 1.485 gr/cc density, which contains 45% by weight sodium bromide in solution. The TCT of the brine is −2° C.

Although sodium bromide cannot match the density achieved by divalent bromide salts, e.g., calcium bromide, its use is of importance in sites where calcium bromide is precluded due to the scaling tendency of the formation water, e.g., when formation waters contain high levels of carbonate and sulfate, because the presence of these anions may lead to precipitation of the corresponding, poorly water soluble, calcium salts.

Therefore, there exists a need to formulate monovalent brines, for example, sodium bromide-based clear fluids, to meet simultaneously the high-density and low-TCT requirements.

We have found that the addition of alkali nitrates (e.g., sodium nitrate, potassium nitrate) to alkali bromide brines affords monovalent brines with reduced TCT. That is, sodium bromide and blends thereof with other alkali bromides, such as sodium bromide/potassium bromide blend, can benefit from the addition of alkali nitrate to achieve— over a useful density range, say, up to 1.56 g/cc—clear monovalent brines that are stable against crystallization down to low ambient temperatures, e.g., down to −15° C. The experimental results reported below indicate that the TCT of the alkali bromide/alkali nitrate systems is reduced by as much as 20° C., relative to the equivalent (i.e., of equal density) alkali bromide (nitrate free) clear fluids.

The alkali nitrates employed as TCT-reducing agents in monovalent bromide brines according to this invention, e.g., sodium nitrate and potassium nitrate, are non-toxic materials (in fact, they are used as fertilizers, food additives and pharmaceutical excipients). Sodium nitrate has the advantage of higher water solubility whereas potassium nitrate is much less hygroscopic and therefore remains in the form of a free-flowing powder even under high humidity. Thus, both sodium and potassium nitrate are easy to formulate in monovalent brines, as shown below.

It should be noted that nitrates (see U.S. Pat. No. 8,003, 578) were suggested for use in wellbore fluids. U.S. Pat. No. 8,003,578 explains that efforts to use nitrate-based brines as completion and packer fluids were abandoned in the 1950s. Example 1 of U.S. Pat. No. 8,003,578 illustrates the dissolution of sodium nitrate in sodium bromine brine, to achieve 13.12 ppg (1.57 g/cc) density. The 13.12 ppg (1.57 g/cc) sodium bromide/sodium nitrate brine was then thickened, e.g., with guar gum in an alkaline pH and its viscosity and thermal stability were evaluated. It is reported in U.S. Pat. No. 8,003,578 that the sodium bromide/sodium nitrate clear brine of 1.57 gr/cc (13.12 ppg) density has crystallization point of 60° F. (+15° C.)

Accordingly, the present invention is primarily directed to a wellbore fluid, which is a monovalent brine comprising one or more alkali bromide salt(s) and one or more TCT-reducing additive(s) selected from the group consisting of alkali nitrates.

The invention further provides a method of preparing wellbore fluid with improved stability against crystallization, comprising formulating one or more alkali bromide(s) and at least one alkali nitrate in water, where the nitrate is present in an amount sufficient to achieve a TCT-lowering effect of not less than 3° C., e.g., TCT is reduced by more than 5° C., or more than 8° C. and sometimes more than 10° C., compared to the corresponding nitrate-free brine of equal density. Owing to the presence of the alkali nitrate, the crystallization of the monovalent brine on cooling (and hence its transformation into unpumpable slurry) is avoided. The invention also provides the use of alkali nitrate as a TCT-lowering agent in monovalent brines of alkali bromides.

One variant of the invention relates to a wellbore fluid, which is a monovalent brine comprising water and a binary salt mixture consisting of sodium bromide and alkali nitrate [namely, sodium nitrate, lithium nitrate or potassium nitrate], especially a sodium bromide/sodium nitrate binary mixture formulated in water to give a clear monovalent brine of density in the range from 1.47 to 1.55 g/ml, e.g., from 1.47 to 1.53 g/ml, displaying lower TCT compared to the corresponding nitrate free brine, e.g., TCT below −5.0° C., below −7.0° C., and even down to below −10° C.

Monovalent brines, in which sodium bromide and sodium nitrate constitute the major and minor components, respectively, are formulated to meet the density and TCT requirements set out above, e.g., a monovalent brine which contains from 30 to 45% by weight sodium bromide and from 3 to 18% by weight sodium nitrate (e.g., from 5 to 15%) in solution. Experimental results reported below indicate a linear relationship between the reduction achieved in TCT and the amount of alkali nitrate in solution (TCT reduction is measured relative to the corresponding nitrate-free sodium bromide brine of equal density). For example, with the aid of ~4-5%, ~8-10% and ~13-15% by weight sodium nitrate in solution, TCT-lowering effects of ~8-9° C., 13-14° C. and 20-21° C. were respectively measured.

Specific monovalent brines comprising binary mixtures of sodium bromide and sodium nitrate for use as wellbore fluids according to the invention are:

Sodium bromide/sodium nitrate brine of density from 1.47 gr/ml to 1.49 gr/ml and TCT below −5.0° C., especially below −7.0° C. (e.g., from 38 to 45% by weight sodium bromide and from 4 to 12% by weight sodium nitrate in aqueous solution);

Sodium bromide/sodium nitrate brine of density from 1.49 gr/ml to 1.52 gr/ml and TCT below −5.0° C., especially below −7.0° C. (e.g., from 35 to 38% by weight sodium bromide and from 13 to 18% by weight sodium nitrate in aqueous solution).

Improving (lowering) TCT was also achieved with the aid of other alkali nitrates, e.g., lithium nitrate and potassium nitrate. The invention therefore also provides monovalent brines comprising binary mixtures of sodium bromide and lithium or potassium nitrate for use as wellbore fluids:

Sodium bromide/lithium nitrate brine of density from 1.47 gr/ml to 1.49 gr/ml and TCT below −5.0° C., especially below −7.0° C. (e.g., from 35 to 42% by weight sodium bromide and from 7 to 10% by weight lithium nitrate in aqueous solution);

Sodium bromide/potassium nitrate brine of density from 1.48 gr/ml to 1.51 gr/ml and TCT below −5.0° C., especially below −7.0° C. (e.g., from 35 to 42% by weight sodium bromide and from 7 to 10% by weight potassium nitrate in aqueous solution).

The TCT-lowering effect of alkali nitrate is observed also in mixed alkali bromide monovalent brine. Accordingly, another variant of the invention relates to a monovalent brine comprising water and a ternary salt mixture consisting of a first alkali bromide, a second alkali bromide and alkali nitrate, such as sodium nitrate. For example, the first alkali bromide is sodium bromide and the second alkali bromide is either lithium bromide, potassium bromide or cesium bromide.

Specific monovalent brines comprising a first alkali bromide, a second alkali bromide and sodium nitrate for use as wellbore fluids, on account of their high density and stability down to low ambient temperatures (TCT below −7° C.) include:

Sodium bromide/lithium bromide/sodium nitrate brine of density higher than 1.47 gr/ml, e.g., from 1.47 gr/ml to 1.49 gr/ml and TCT below −5.0° C., especially below −7.0° C. [formulated to contain from 30 to 35% by weight sodium bromide (e.g., 33-35%); from 5 to 10% by weight lithium bromide (e.g., 5-7%); and from 6 to 10% by weight sodium nitrate (e.g., 7-9%) in aqueous solution];

Sodium bromide/potassium bromide/sodium nitrate brine of density higher than 1.51 gr/ml, e.g., from 1.51 gr/ml to 1.54 gr/ml and TCT below −5.0° C., especially below −7.0° C. [formulated to contain from 30 to 37% by weight sodium bromide (e.g., 33 to 35%); from 5 to 10% by weight potassium bromide (e.g., 7-9%); and from 6 to 10% by weight sodium nitrate (e.g., 7-9%) in aqueous solution];

Sodium bromide/cesium bromide/sodium nitrate brine of density higher than 1.53 gr/ml, e.g., from 1.53 gr/ml to 1.57 gr/ml and TCT below −5.0° C., especially below −7.0° C. [formulated to contain from 33 to 37% by weight sodium bromide, from 5 to 10% by weight cesium bromide (e.g., 7-9%) and from 5 to 10% by weight sodium nitrate (e.g., 7-9%) in aqueous solution].

The monovalent brines described herein are readily prepared by combining in water one or more alkali bromide(s) and one or more alkali nitrates(s). One convenient method to formulate the monovalent brine consists of adding alkali nitrate to a clear, nearly saturated or saturated aqueous solution of alkali bromide(s) (solubility of sodium bromide in water is 48% by weight), with the addition of water to dissolve the added nitrate, followed by filtration to remove undissolved solids if needed and further dilution with water and/or the addition of dry salts to adjust the density within the desired range.

The alkali bromide solution required for the preparation of the monovalent brine of this invention is obtained either by dissolving solid sodium bromide in water to reach saturation, by reacting elemental bromine with a suitable sodium compound in aqueous solution under conditions preventing bromate formation or after removal of the bromate by-product, or by reacting hydrogen bromide with sodium hydroxide by the methods known in the art.

It should be noted that alkali nitrates, such as sodium nitrate, exhibit high solubility in sodium bromide brines and the dissolution of solid sodium nitrate in saturated sodium bromide solution is achieved rather easily, at ambient temperature under stirring, whereby significant amount of sodium nitrate can be loaded into the monovalent brine, e.g., up to 15% by weight. Heating of the solution to facilitate dissolution of the nitrate is normally not required, unless preparation of the brine takes place on-site under conditions of cold temperature. Higher nitrate concentration may require addition of water and heating to achieve dissolution.

Another procedure to produce the monovalent brine of the invention with desired density and TCT is by mixing concentrated, nearly saturated aqueous solutions of alkali bromide and alkali nitrate in varying amounts and adjusting the density by further addition of the salts in solid form.

The mixed monovalent bromide/nitrate brine displays good stability, i.e., sodium bromide/sodium nitrate brines with varying loading of the nitrate, which were examined for their stability under severe conditions—held in an oven at 120° C. for six days—showed no signs of incompatibility or instability (neither color change nor evolution of gas). In contrast, as indicated by experimental results reported below, dissolution of sodium nitrate in calcium bromide or manganese bromide saturated solutions, to create clear brines, is difficult or impossible to achieve.

In addition to alkali bromide(s)/alkali nitrate(s), the wellbore fluid of the invention may contain conventional constituents, such as viscosifiers, to increase viscosity, pH modifiers, oxygen scavengers and corrosion inhibitors. We have found that that the corrosiveness of the monovalent brine of this invention is tolerable and in fact comparable or even slightly lower corrosion rates are expected, compared to a corresponding alkali bromide (nitrate-free) brine, as shown by a corrosion test reported below (using an electrochemical corrosion measurement system).

The pH of the monovalent brine of this invention is nearly neutral, e.g., lying in the range from 6 to 8, e.g., from 7 to 8, such as ~7.5.

The foregoing monovalent brines of alkali bromide and alkali nitrate can be used as high density low TCT wellbore fluids, e.g., as drilling fluids, completion fluids, workover fluids, packer fluids, as described, for example, in GB 2089397. Such uses of the monovalent brines form additional aspects of the invention.

A drilling fluid is introduced into the wellbore to serve several functions, such as lubricating and cooling the drilling bit, carrying away material removed from the formation, and preventing high pressure subterranean fluids from intruding into the borehole.

Completion fluid is placed in the well to facilitate final operations prior to production.

Workover fluid is used when the productivity of the well decreases or when safety problems are of concern. The workover fluid is pumped into the wellbore to control the well.

Packer fluid is placed in the annular space between the production tubing and the well casing to lower the differential pressure on the wellbore casing and prevent collapse.

The invention further provides a method for treating subterranean formation comprising delivering the monovalent brine described herein to a well in the formation, e.g., a method of drilling, working over, completing or packing a wellbore, by placing in the wellbore said monovalent brine. As noted above, the monovalent brine of the invention is suitable for treating subterranean formations, wherein formation waters contain carbonate and sulfate.

An apparatus for using the monovalent brine as a subterranean fluid is described, for example, in US 2018/0298266, e.g., FIGS. 1 and 2 of US 2018/0298266. The monovalent brine is prepared in a tank by combining water and salt components as described above. The clear monovalent brine is supplied via a suitable feed line to a production tubing penetrating into the subterranean formation, with the aid of a suitable pump, e.g., a high pressure pump. The aqueous wellbore fluid can be recirculated back to the surface via an annular space that exists between the wellbore walls and the tubing, to be regenerated (e.g., by filtration and addition of fresh salts to restore the required density and TCT, etc.).

IN THE DRAWINGS

EXAMPLES

Methods

Figure 1:
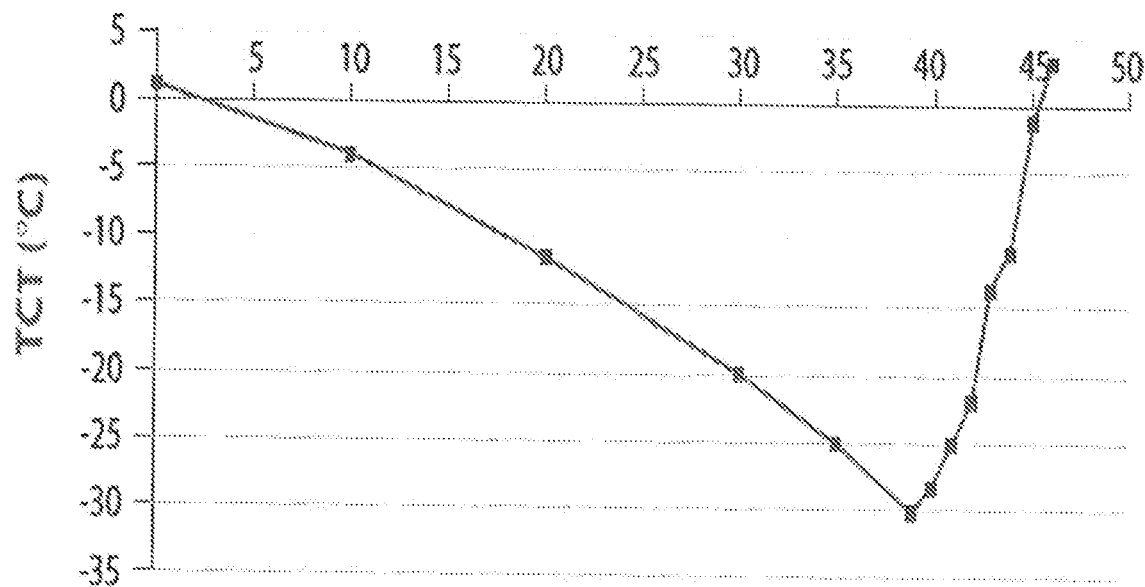
FIG. 1 is a TCT versus concentration plot of sodium bromide brine.

Density measurements: an empty, clean and dry volumetric flask of 25.00 ml (±0.04 ml) was weighed on an analytical balance (±0.0001 gr). The flask was filled up to 25.00 ml with the desired solution. The outer wall of the flask was cleaned and dried. The flask was observed to ascertain that there were no air bubbles in the solution. The full flask was weighed on the analytical balance and its weight was recorded. The temperature of the solution was also measured, and the density was calculated (temperature of measurements reported herein is 26±1° C.).

TCT measurements: 25-30 ml of the test sample, pinch of a nucleation agent and magnetic stirrer were placed in a 50 ml beaker. Silicon oil (~50 ml) was introduced into a 250 ml jacketed glass cup. The 50 ml beaker with the sample was inserted into the 250 ml jacketed glass cup (with the silicon oil inside) connected to a Huber silicon oil circulation thermostat in such a way that the sample was cooled by the silicon oil in the cup; the thermocouple was immersed into the solution and the cup was covered with the cap. The 250 ml jacked glass cup with the beaker inside was placed on the stirring plate and stirring of the solution was started. The initial temperature in the thermostat was set at 10° C. and was decreased gradually during the measurements down to −20° C. if needed. When crystals began to form, the corresponding temperature was written down (FCTA—first crystal to appear), afterwards the temperature slightly increased, indicating the TCT.

Bromide concentration in the solution: measurements were made by direct potentiometric titration using a silver electrode and 0.1M $AgNO_3$ titrant solution after adding 2N $HNO_3$.

Nitrate concentration in the solution: analysis by Ion Chromatography (IC). The analysis was done against an external standard, Dionex Seven Anion standard P.N. 057590. The instrument used was a Dionex ICS-2100 with an AS-9HC column.

Example 1

Solubility of $NaNO_3$ in NaBr Solution and Properties of the $NaBr/NaNO_3$ Salt Solution Sodium bromide clear brine of 1.496 gr/cc (12.48 ppg) density contains 46.4% by weight sodium bromide in solution. The TCT of the brine is 6.5° C. and its pH is 7.3.

To this clear sodium bromide brine (100 g) was added sodium nitrate (11 gr). The added sodium nitrate dissolved swiftly in the sodium bromide brine at room temperature under stirring, to form $NaBr/NaNO_3$~10% solution of 1.55 gr/cc (12.94 ppg) density.

Water (7.8 gr) was added, to afford a $NaBr/NaNO_3$ clear solution of 1.496 gr/cc (12.48 ppg) density with TCT of −8.7° C., i.e., reduction of about 16 degrees compared to the single salt sodium bromide solution of 1.496 gr/cc (12.48 ppg) density.

Example 2 (Comparative)

Solubility of $NaNO_3$ in $CaBr_2$ 52% Solution

Calcium bromide clear brine of 1.71 gr/cc (14.2 ppg) density contains 52% by weight calcium bromide in solution. The TCT of the brine is −17° C. and its pH is 6.5.

To this clear calcium bromide brine (100 g) was added sodium nitrate (11 gr). Only partial dissolution of the added salt was observed. The experiment was repeated, this time with a lesser amount of sodium nitrate (~5 gr). Most of the added amount dissolved at room temperature. However, to achieve full dissolution of the ~5 gr sodium nitrate in calcium bromide 52% solution, it was necessary to heat the solution.

Example 3 (Comparative)

Solubility of $NaNO_3$ in $MnBr_2$ 58% Solution

Manganese bromide clear brine of 1.90 gr/cc (15.86 ppg) density contains ~58% by weight manganese bromide in solution. The TCT of the brine is 4.7° C. and its pH is 3.

To this clear manganese bromide brine (100 g) was added sodium nitrate (11 gr). Dissolution of sodium nitrate was observed, followed by color change, from pink-reddish to brown, and formation of a brown precipitate a few hours later. The observations indicated oxidation of $Mn^{2+}$ to $Mn^{3+}$ and generation of a brown precipitate of $Mn_2O_3$.

Example 4

Preparing and Testing $NaBr/NaNO_3$ Solutions with Varying $NaNO_3$ Concentration A saturated sodium bromide solution was prepared by charging a vessel with solid sodium bromide (530 gr) and water (470 gr). The mixture was stirred to achieve dissolution of the salt. To obtain full dissolution, an additional amount of water was gradually added, affording a clear fluid which contained ~48% by weight sodium bromide in solution. The total weight was >1000 g.

Three portions were taken from the saturated sodium bromide solution, each consisting of 320 gr. Sodium nitrate was then added to each of these sodium bromide solutions in the following amounts: 16 gr, 32 gr and 48 gr, to create three stock sodium bromide solutions that contained ~5%, ~9% and ~13% by weight sodium nitrate, respectively.

Each of the three stock solutions was divided into 50 gr portions, which were diluted by the addition of small amounts of water (1-1.5 gr, 2-2.5 gr, 3-3.5 gr, 4-4.5 gr, 5-5.5 gr).

Compositions and properties (density and TCT) of the stock solutions and diluted solutions are tabulated in Table 1 (because test solutions were prepared by dilution of stock solutions of ~5%, ~9% and ~13% $NaNO_3$ concentration as described above, $NaNO_3$ concentrations are actually slightly lower; for simplicity, the ~5%, ~9% and ~13% values are indicated in Table 1 and the accompanying graph).

Figure 2:
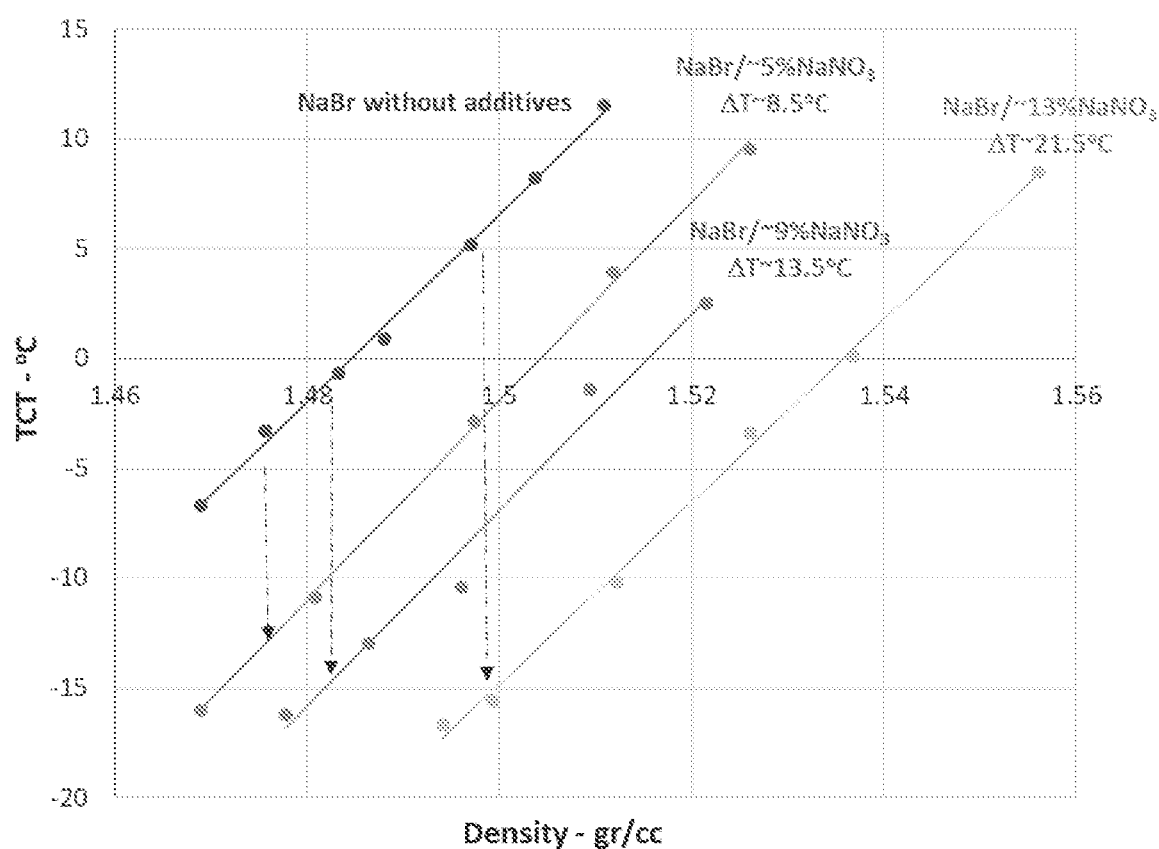
FIG. 2 shows TCT versus density plots of sodium bromide/sodium nitrate brines.

Results are presented in graphical form in FIG. 2. TCT versus density plots show a linear relationship across the density range under consideration for all four systems, with roughly comparable slopes, as indicated by the four parallel straight lines. However, the TCT of sodium bromide/sodium nitrate brines are lower than that of the corresponding (i.e., of comparable density) sodium bromide brine. Furthermore, lower TCTs can be achieved with an increasing concentration of sodium nitrate in the multi-salt solution: the presence of ~5%, ~9% and ~13% by weight of sodium nitrate in sodium bromide solution leads to a TCT reduction of ~8.5° C., ~13.5° C. and ~21.5° C., respectively, compared to the single salt solution.

Owing to the effect of sodium nitrate on TCT, sodium bromide and sodium nitrate can be formulated, over a useful density range (say, 1.47 g/cc up to 1.54 g/cc), to give solutions stable against crystallization down to approximately −20° C.

Example 5

Preparing and Testing $NaBr/KBr/NaNO_3$ Solutions

To a saturated sodium bromide 48% solution (300 gr) prepared as described above was added potassium bromide (30 gr), followed by the addition of water to obtain a clear fluid. A few samples (50 gr each) were taken and diluted with water to produce sodium bromide/potassium bromide solutions spanning a density range from 1.536 to 1.470 g/cc.

Another set of samples was prepared by the addition of sodium nitrate (35 gr) to a stock sodium bromide/potassium bromide solution, followed by addition of water and removal of non-dissolved solids by filtration, to obtain a clear brine of 1.593 gr/cc density, which contained 36.7% by weight sodium bromide, 8% by weight potassium bromide and 8.6% sodium nitrate in solution. This clear brine served as a stock solution to create a series of diluted solutions by the addition of small quantities of water. Compositions and properties of the sodium bromide/potassium bromide and sodium bromide/potassium bromide/sodium nitrate solutions are set out in Table 2.

TABLE 2

| NaBr/KBr | | | | NaBr/KBr/NaNO$_3$ | | | | |
| --- | --- | --- | --- | --- | --- | --- | --- | --- |
| NaBr % | KBr % | d g/cc | TCT ° C. | NaBr % | KBr % | NaNO$_3$ % | d g/cc | TCT ° C. |
| 40.0 | 8.7 | 1.536 | 14.3 | 36.7 | 8 | 8.6 | 1.593 | 14.7 |
| ND | ND | 1.520 | 8.8 | ND | ND | ND | 1.568 | 5.4 |
| ND | ND | 1.503 | 2.3 | 35.2 | 7.8 | 8.2 | 1.560 | 1.6 |

TABLE 1

| NaBr single | | | NaBr/~5% NaNO$_3$ | | | NaBr/~9% NaNO$_3$ | | | NaBr/~13% NaNO$_3$ | | |
| --- | --- | --- | --- | --- | --- | --- | --- | --- | --- | --- | --- |
| NaBr % | d g/cc | TCT ° C. | NaBr % | d g/cc | TCT ° C. | NaBr % | d g/cc | TCT ° C. | NaBr % | d g/cc | TCT ° C. |
| 47.0 | 1.510 | 11.5 | 43.9 | 1.526 | 9.5 | ND | 1.555 | 14.7 | 39.7 | 1.556 | 8.5 |
| 46.6 | 1.503 | 8.2 | 43.1 | 1.512 | 3.9 | 42.1 | 1.522 | 2.5 | 38.5 | 1.537 | 0.1 |
| 46.4 | 1.497 | 5.2 | 41.8 | 1.497 | −2.9 | 40.4 | 1.509 | −1.4 | 38 | 1.526 | −3.4 |
| 45.5 | 1.488 | 0.9 | 41.0 | 1.481 | −10.9 | 40.2 | 1.496 | −10.4 | 37.2 | 1.512 | −10.2 |
| 45.2 | 1.483 | −0.7 | 40.5 | 1.469 | −16 | 38.9 | 1.486 | −13 | 36.6 | 1.499 | −15.6 |
| 44.6 | 1.476 | −3.3 | | | | 38.6 | 1.478 | −16.2 | 36.5 | 1.494 | −16.7 |

TABLE 2-continued

| NaBr/KBr | | | | NaBr/KBr/NaNO₃ | | | | |
|---|---|---|---|---|---|---|---|---|
| NaBr % | KBr % | d g/cc | TCT °C. | NaBr % | KBr % | NaNO₃ % | d g/cc | TCT °C. |
| 38.3 | 8.3 | 1.489 | −2.2 | ND | ND | ND | 1.546 | −3 |
| ND | ND | 1.479 | −5.8 | ND | ND | ND | 1.530 | −7.7 |
| 36.6 | 8.7 | 1.470 | −8.9 | 33.5 | 7.4 | 7.4 | 1.517 | −13.5 |

Figure 3:
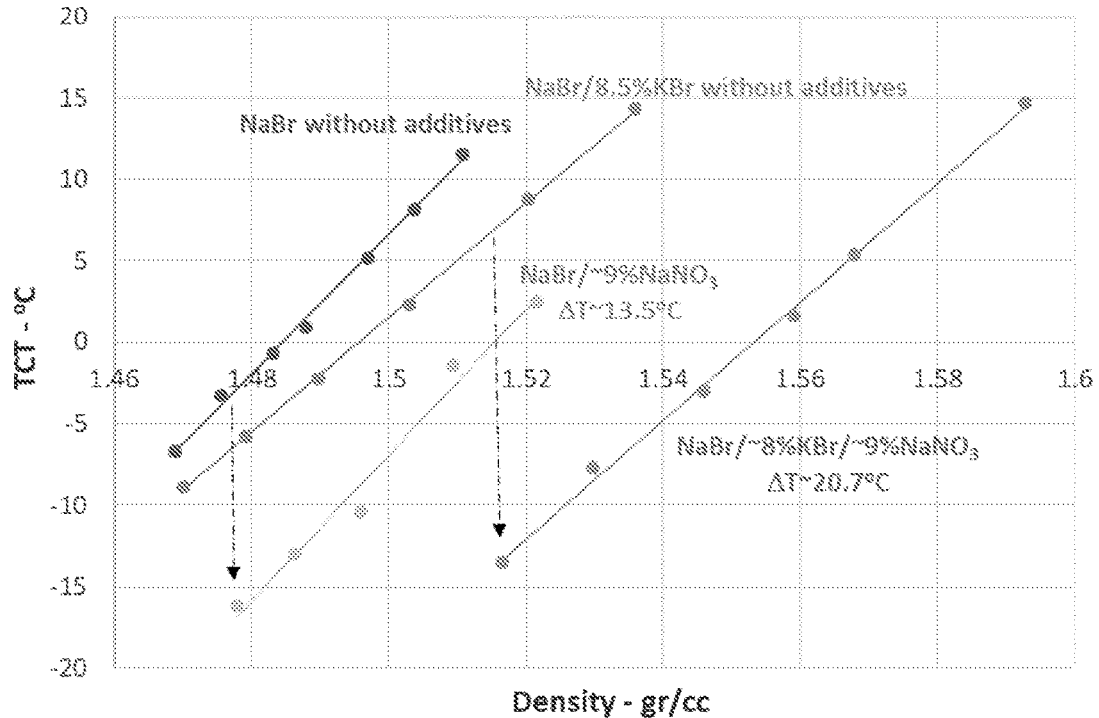
FIG. 3 shows TCT versus density plots of sodium bromide/potassium bromide/sodium nitrate brines.

The graph of FIG. 3 indicates that a ternary blend composed of sodium bromide/potassium bromide/sodium nitrate can be formulated in water to give a clear brine of >1.5 g/cc density, exhibiting surprisingly low TCT, i.e., from −15° C. to −5° C. By contrast, in the absence of sodium nitrate, solids are crystallized out of sodium bromide/potassium bromide binary solutions of >1.5 g/cc density at a temperature in the range from +5° C. to +15° C. That is, across a useful density range [>1.5 g/cc], TCT can be reduced by ~20° C. with the aid of sodium nitrate.

The graph of FIG. 3 further depicts a pair of straight lines representing TCT versus density plots for sodium bromide alone and sodium bromide/sodium nitrate, demonstrating a decrease of 13.5° C. in TCT owing to the addition of sodium nitrate, as previously discussed for Example 4.

The results shown in FIG. 3 underscore the strong effect of sodium nitrate addition on the TCT of a sodium bromide/potassium bromide brine.

Example 6

Preparing and Testing NaBr/LiBr/NaNO₃ Solutions

To a saturated sodium bromide 48% solution (320 gr) prepared as described above was added lithium bromide (32 gr), followed by addition of water to obtain a clear fluid. A few samples (50 gr each) were taken and diluted with water to produce sodium bromide/lithium bromide solutions spanning a density range from 1.513 to 1.456 g/cc.

Another set of samples was prepared by the addition of sodium nitrate (32 gr) to a sodium bromide/lithium bromide stock solution, followed by addition of water, following which non-dissolved solids were removed by filtration and a clear brine of 1.528 gr/cc density was collected, which contained 34.9% by weight sodium bromide, 6.5% by weight lithium bromide and 8.14% sodium nitrate in solution. This clear brine served as a stock solution to create a series of diluted solutions by the addition of small quantities of water.

Compositions and properties of the sodium bromide/lithium bromide and sodium bromide/lithium bromide/sodium nitrate solutions are set out in Table 3.

TABLE 3

| NaBr/LiBr | | | | NaBr/LiBr/NaNO₃ | | | | |
|---|---|---|---|---|---|---|---|---|
| NaBr % | LiBr % | d g/cc | TCT °C. | NaBr % | LiBr % | NaNO₃ % | d g/cc | TCT °C. |
| 37.9 | 9.9 | 1.513 | 21.1 | 34.9 | 6.5 | 8.14 | 1.528 | 9.5 |
| ND | ND | 1.495 | 15.8 | ND | ND | ND | 1.512 | 2.7 |
| 36.6 | 9.7 | 1.483 | 10.8 | 34 | 6.5 | 8.14 | 1.497 | −2.9 |
| ND | ND | 1.470 | 5.3 | ND | ND | ND | 1.483 | −7.2 |
| 35.4 | 9.1 | 1.456 | −1.7 | 33.2 | 6.1 | 7.77 | 1.476 | −11.8 |
| | | | | | | | 1.468 | −14 |

Figure 4:
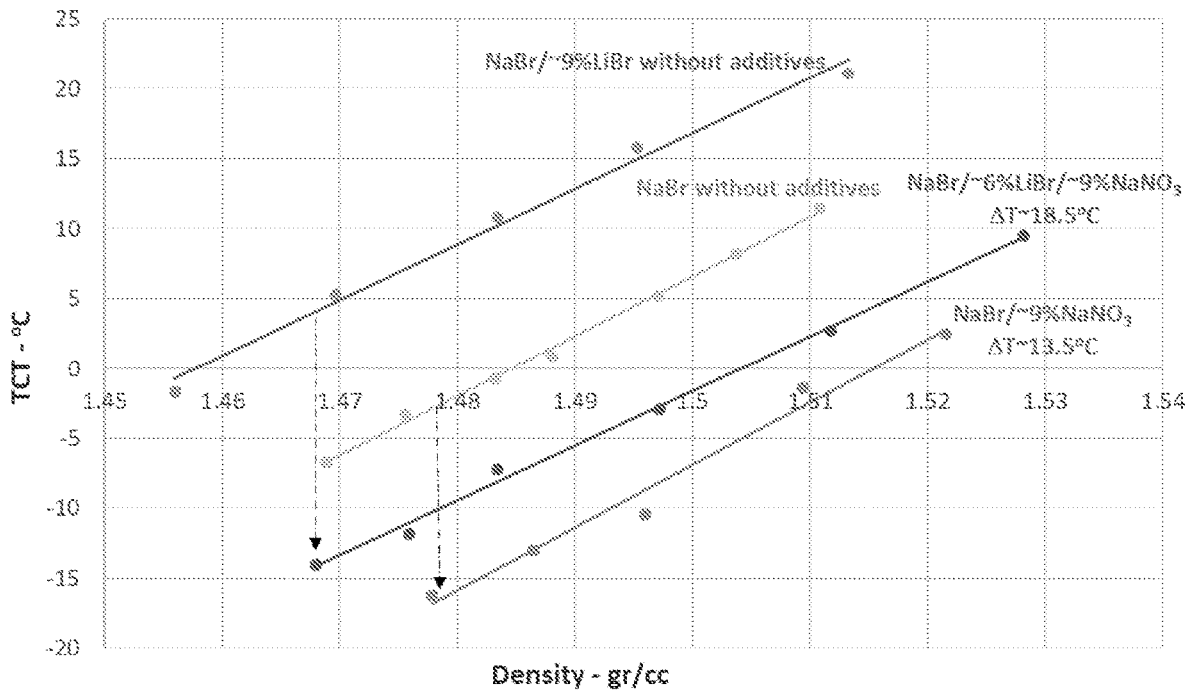
FIG. 4 shows TCT versus density plots of sodium bromide/lithium bromide/sodium nitrate brines.

Addition of lithium bromide to sodium bromide solution increases significantly the TCT of the mixture compared to the single salt sodium bromide brine. The effect of the addition of sodium nitrate on the TCT of sodium bromide/lithium bromide brine is shown graphically in FIG. 4. Also in this type of alkali bromide blend, sodium nitrate produces a useful effect: sodium bromide/lithium bromide/sodium nitrate solution is stable against crystallization down to temperatures of from −15° C. to −5° C., i.e., about 18° C. lower than TCTs of equivalent (i.e., of equal density) sodium bromide/lithium bromide binary solutions. However, it is seen that the straight line corresponding to the sodium bromide/sodium nitrate clear fluid is positioned below that of the sodium bromide/lithium bromide/sodium nitrate system, indicating that over the density range under consideration, lower TCTs were measured for the sodium bromide/sodium nitrate binary blends than for lithium-containing ternary blends.

Example 7

Preparing and Testing NaBr/CsBr/NaNO₃ Solutions

To a saturated sodium bromide 48% solution (300 gr) prepared as described above was added cesium bromide (30 gr), followed by addition of water to obtain a clear fluid. A few samples (50 gr each) were taken and diluted with water to produce sodium bromide/cesium bromide solutions spanning a density range from 1.611 to 1.531 g/cc.

Another set of samples was prepared by the addition of sodium nitrate (33.5 gr) to a sodium bromide/cesium bromide stock solution, following which non-dissolved solids were removed by filtration and a clear brine of 1.615 gr/cc density was collected, which contained 36.7% by weight sodium bromide, 8.7% by weight cesium bromide and 8.9% sodium nitrate in solution. This clear brine served as a stock solution to create a series of diluted solutions by the addition of small quantities of water.

Compositions and properties of the sodium bromide/cesium bromide and sodium bromide/cesium bromide/sodium nitrate solutions are set out in Table 4.

TABLE 4

| NaBr/CsBr | | | | NaBr/CsBr/NaNO₃ | | | | |
|---|---|---|---|---|---|---|---|---|
| NaBr % | CsBr % | d g/cc | TCT °C. | NaBr % | CsBr % | NaNO₃ % | d g/cc | TCT °C. |
| 43.1 | 9.8 | 1.611 | 16.8 | 36.7 | 8.7 | 8.9 | 1.615 | 9.4 |
| ND | ND | 1.585 | 8.3 | Nd | ND | ND | 1.589 | 0.6 |
| ND | ND | 1.568 | 1.8 | 35.3 | 8.2 | 8.6 | 1.571 | −7.1 |
| 40.0 | 9.0 | 1.551 | −5.8 | ND | ND | ND | 1.551 | −11.8 |
| 39.5 | 8.8 | 1.531 | −11.8 | 34.5 | 8.3 | 8.3 | 1.546 | −13.4 |

Figure 5:
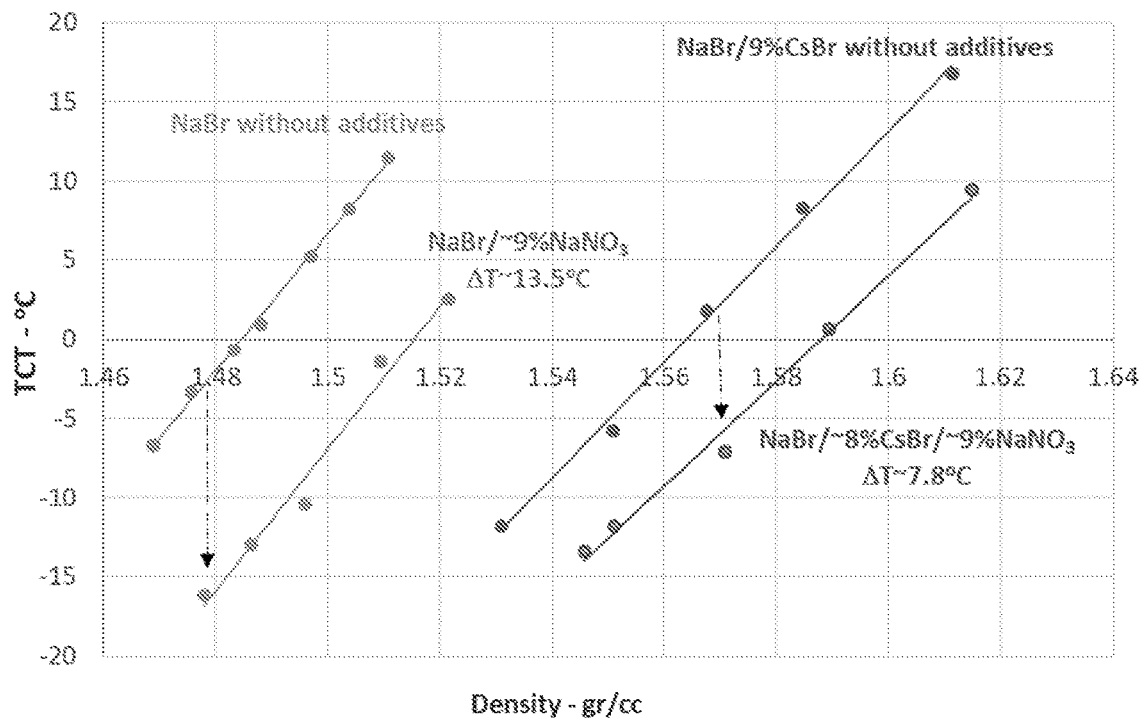
FIG. 5 shows TCT versus density plots of sodium bromide/cesium bromide/sodium nitrate brines.

The information gleaned from the graph of FIG. 5 is that the sodium bromide/cesium bromide/sodium nitrate brine displays TCTs that are about 8° C. lower than sodium bromide/cesium bromide brines of equal density. This magnitude of reduction of TCT is smaller than previously observed for the other blends of alkali bromides. Nevertheless, incorporation of cesium bromide shifts the density towards higher ranges, say, >1.55 g/cc relative to cesium-free bromide mixtures, such that sodium bromide/cesium bromide/sodium nitrate blends can be formulated in water to give a clear brine of >1.55 g/cc density that does not crystallize out solids down to temperatures in the range from −15° C. to −5° C.

Example 8

Preparing and Testing NaBr/MNO₃ Solutions (M=Li, Na and K)

A set of solutions was prepared by the methods described above, to investigate the effect of the alkali nitrate ($LiNO_3$, $NaNO_3$ and $KNO_3$) on the TCT of sodium nitrate/alkali nitrate systems. The concentration of the added alkali nitrate was ~9%. Compositions (sodium bromide/alkali nitrate concentrations) and properties of the solutions (density and TCT) are set out in Table 5.

TABLE 5

| NaBr alone | | | NaBr/~9% LiNO₃ | | | | NaBr/~9% NaNO₃ | | | | NaBr /~9% KNO₃ | | | |
|---|---|---|---|---|---|---|---|---|---|---|---|---|---|---|
| NaBr % | d g/cc | TCT °C. | NaBr % | LiNO₃ % | d g/cc | TCT °C. | NaBr % | NaNO₃ % | d g/cc | TCT °C. | NaBr % | kNO₃ % | d g/cc | TCT °C. |
| 47.0 | 1.510 | 11.5 | 42.5 | 10.2 | 1.544 | 15.8 | ND | ND | 1.555 | 14.7 | 42.2 | 9.4 | 1.544 | 6.2 |
| 46.6 | 1.503 | 8.2 | ND | ND | 1.530 | 8.6 | 42.1 | 10.4 | 1.522 | 2.5 | ND | ND | 1.528 | −0.3 |
| 46.4 | 1.497 | 5.2 | ND | ND | 1.514 | 3.7 | 40.4 | 8.5 | 1.509 | −1.4 | 40.0 | 9.1 | 1.511 | −5.3 |
| 45.5 | 1.488 | 0.9 | 40.3 | 8.2 | 1.500 | −2.2 | 40.2 | 8.2 | 1.496 | −10.4 | ND | ND | 1.500 | −11.5 |
| 45.2 | 1.483 | −0.7 | ND | ND | 1.489 | −7.0 | 38.9 | 8.0 | 1.486 | −13 | 38.6 | 8.6 | 1.484 | −16.3 |
| 44.6 | 1.476 | −3.3 | 38.9 | 9.1 | 1.476 | −12.3 | 38.6 | 8.1 | 1.478 | −16.2 | | | | |
| | 1.469 | −6.7 | | | | | ND | ND | 1.463 | <−18 | | | | |

Figure 6:
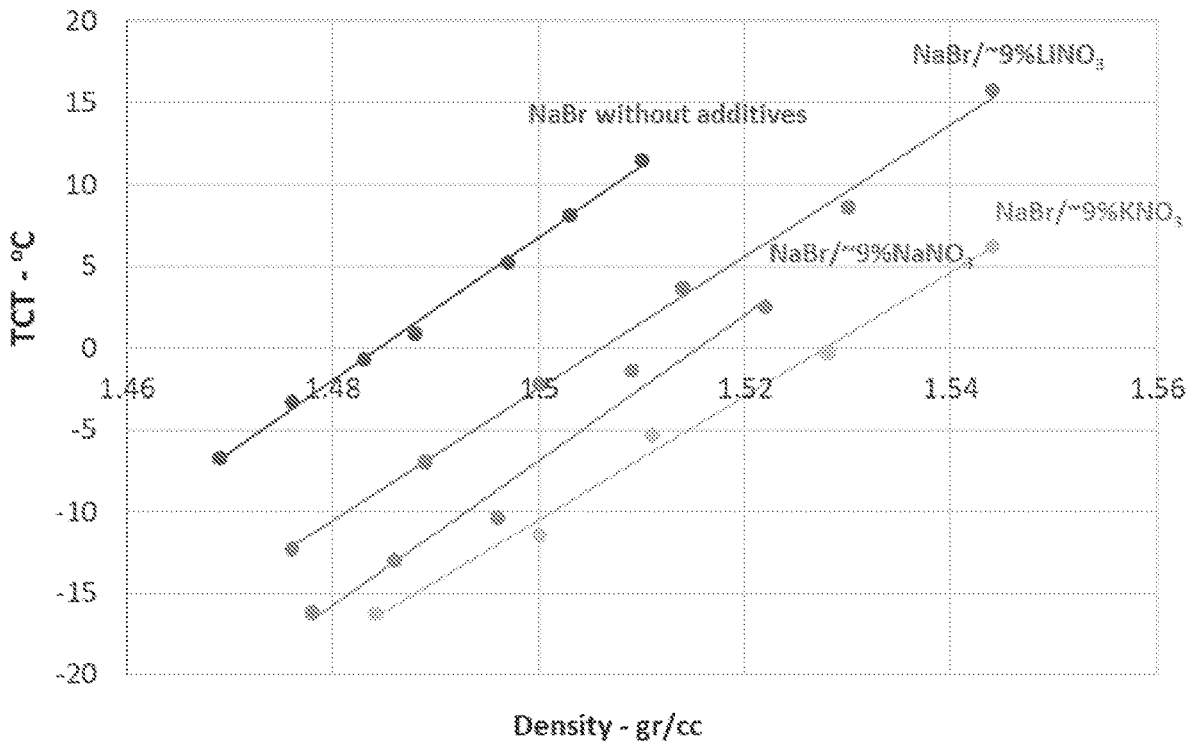
FIG. 6 shows TCT versus density plots of sodium bromide/sodium nitrate, sodium bromide/lithium nitrate and sodium bromide/potassium nitrate brines.

Graphical representation is provided in FIG. 6. The results indicate that a TCT reduction effect is achieved by the addition of different alkali nitrates to sodium bromide.

Example 9

Corrosion Experiment

The effect of the presence of sodium nitrate in sodium bromide brine on the corrosivity of the solution was evaluated using three-electrode cell arrangement, where the working electrode, (consisting of the tested specimen) was made of carbon steel ST-37. Platinum and Ag/AgCl (in 3.5 M KCl) served as counter and reference electrodes, respectively. The instrument used for the measurements was VersaSTAT 3 equipped with V3-Studio software package. Nitrate-free sodium bromide solution of 1.491 gr/cc density (pH-7.6) and 39.5% sodium bromide/7.7% sodium nitrate solution of 1.496 gr/cc density were tested.

Figure 7:
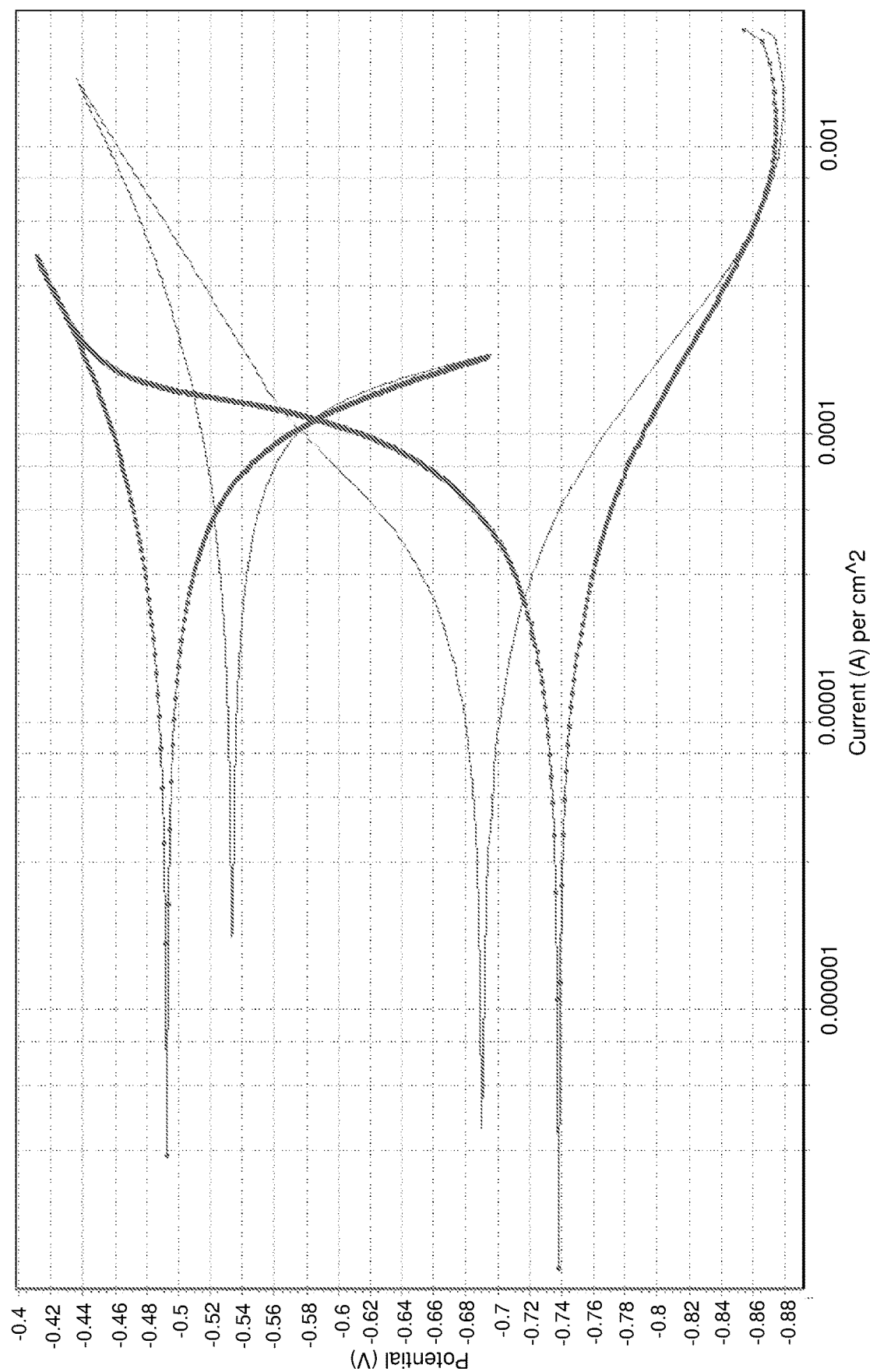
FIG. 7 shows cyclic polarization curves to illustrate the noncorrosive behavior of sodium bromide/sodium nitrate solution.

Cyclic polarization curves for ST-37 in sodium bromide and sodium bromide/sodium nitrate solution are shown in FIG. 7 (red and blue curves, respectively). Tafel analysis is used to determine corrosion potential ($E_{corr}$) and corrosion current ($I_{corr}$), obtained by the intersection of the linear sections corresponding to anodic and cathodic currents. Results are tabulated in Table 6.

TABLE 6

| Solution | $E_{corr}$ (mV) | $I_{corr}$ (μA) |
|---|---|---|
| NaBr | 690.57 | 146.64 |
| NaBr/NaNO₃ | 738.24 | 103.2 |

Generally, the behavior of carbon steel ST-37 in contact with the two brines is similar, as is demonstrated by the comparable $E_{corr}$ and $I_{corr}$ values and the general shape of the curves. A difference in favor of the NaBr/NaNO₃ brine is observed across the anodic branch, with the mixed NaBr/NaNO₃ brine showing increased passivation range. The formation of negative hysteresis for both solutions indicates that pitting—significant corrosion occurring in a small area—has not been developed.

The invention claimed is:

1. A wellbore fluid, which is a monovalent brine comprising one or more alkali bromide salt(s) and one or more TCT-reducing additive (s) selected from the group consisting of alkali nitrates, wherein the monovalent brine comprises water and a binary salt mixture consisting of sodium bromide and alkali nitrate, said monovalent brine being of density in the range from 1.47 to 1.55 g/ml; and
   wherein the monovalent brine is sodium bromide/sodium nitrate brine of density from 1.49 gr/ml to 1.52 gr/ml and TCT below −5.0° C. or
   wherein the monovalent brine is sodium bromide/potassium nitrate brine of density from 1.48 gr/ml to 1.51 gr/ml and TCT below −5.0° C.

2. A wellbore fluid according to claim 1, comprising from 35 to 38% by weight of the sodium bromide and from 13 to 18% by weight of the sodium nitrate in aqueous solution.

3. A wellbore fluid according to claim 1, comprising from 35 to 42% by weight of sodium bromide and from 7 to 10% by weight of the potassium nitrate in aqueous solution.

4. A wellbore fluid according to claim 1, having a pH from 6 to 8.

5. A wellbore fluid according to claim 1, having a pH from 7 to 8.

6. A wellbore fluid according to claim 1, having pH 7.5.

7. A wellbore fluid, which is a monovalent brine comprising one or more alkali bromide salt(s) and one or more TCT-reducing additive (s) selected from the group consisting of alkali nitrates, said monovalent brine comprising water and a ternary salt mixture consisting of a first alkali bromide, a second alkali bromide and alkali nitrate, wherein the first alkali bromide is sodium bromide, the second alkali bromide is lithium bromide, potassium bromide or cesium bromide and the alkali nitrate is sodium nitrate; and
   wherein the monovalent brine is sodium bromide/lithium bromide/sodium nitrate brine of density from 1.47 gr/ml to 1.49 gr/ml and TCT below −5.0° C., or
   wherein the monovalent brine is sodium bromide/potassium bromide/sodium nitrate brine of density from 1.51 gr/ml to 1.54 gr/ml and TCT below −5.0° C., or
   wherein the monovalent brine is sodium bromide/cesium bromide/sodium nitrate brine of density from 1.53 gr/ml to 1.57 gr/ml and TCT below −5.0° C.

8. A wellbore fluid according to claim 7, comprising from 30 to 35% by weight of the sodium bromide; from 5 to 10% by weight of the lithium bromide; and from 6 to 10% by weight of the sodium nitrate in aqueous solution.

9. A wellbore fluid according to claim 7, comprising from 30 to 37% by weight of the sodium bromide; from 5 to 10% by weight of the potassium bromide; and from 6 to 10% by weight of the sodium nitrate in aqueous solution.

10. A wellbore fluid according to claim 7, comprising from 33 to 37% by weight of the sodium bromide; from 5 to 10% by weight of the cesium bromide; and from 5 to 10% by weight of the sodium nitrate in aqueous solution.

11. A method of treating a subterranean formation, comprising placing the wellbore fluids of claim 1 in a wellbore in the subterranean formation.

* * * * *